Patented Jan. 22, 1935

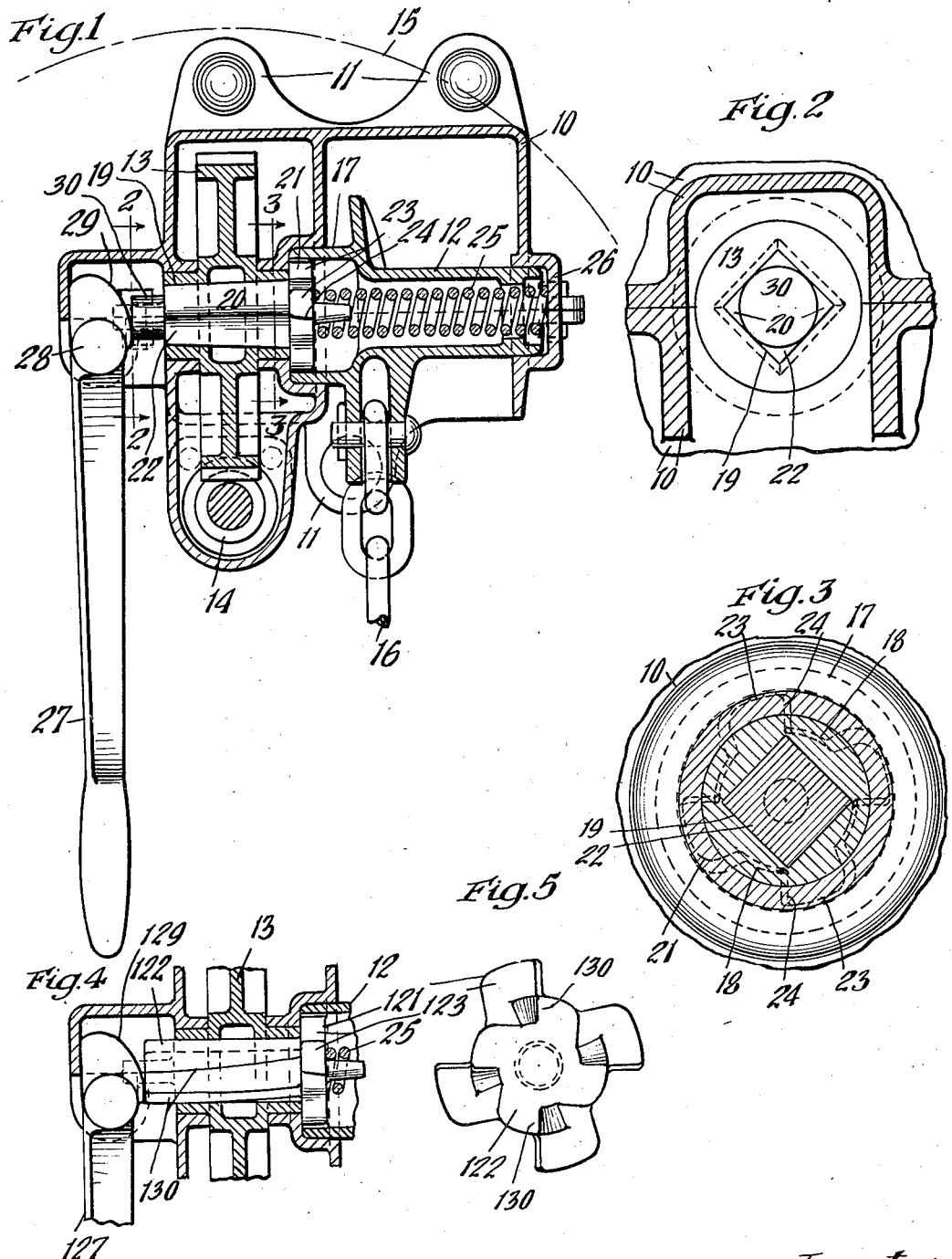

1,988,590

UNITED STATES PATENT OFFICE 1,988,590

CLUTCH

William A. Geiger, Chicago, Ill., assignor to W. H. Miner, Inc., Chicago, Ill., a corporation of Delaware Application June 29, 1931, Serial No. 547,602

9 Claims. (Cl. 192—67)

This invention relates to improvements in clutches especially adapted for use in connection with hand brake mechanisms of railway cars for operatively connecting the chain winding drum thereof to the manually actuated operating means.

The main object of the invention is to provide a clutch mechanism which requires a minimum amount of effort to release when under pressure, such as is induced by the tension of the tightened brake chain of a hand brake mechanism.

A more specific object of the invention is to provide a releasable clutch mechanism for operatively connecting a rotary actuating member and a driven member, wherein the clutch mechanism includes a movable element having a clutch head cooperating with clutch projections on one of said members and having a stem slidably connected with the other member but rotatable in unison therewith, the shank being reciprocable in an opening provided on said last named member to permit the necessary sliding movement, the shank of the clutch element and the walls of the opening of said member having shouldered engagement on faces inclined with respect to the direction of axial sliding movement of said clutch member, thereby preventing sticking of the stem thereof, which might otherwise occur due to excessive friction between the cooperating engaging faces.

Other objects of the invention will more clearly appear from the description and claims hereinafter following.

In the drawing, forming a part of this specification, Figure 1 is a vertical sectional view through a hand brake mechanism, illustrating my improvements in connection therewith. Figures 2 and 3 are enlarged, vertical sectional views, corresponding respectively to the lines 2—2 and 3—3 of Figure 1, Figure 2 being partly broken away. Figure 4 is a view similar to Figure 1, but showing only a portion of the hand brake mechanism and illustrating another embodiment of the invention. And Figure 5 is an end elevational view, on an enlarged scale, of the sliding clutch element illustrated in Figure 4.

Referring first to the embodiment of the invention illustrated in Figures 1, 2, and 3, my improved clutch mechanism is shown as employed in connection with a hand brake mechanism of the worm gear driven type. The operative parts of the hand brake mechanism are mounted within a housing 10 secured to the end wall of the car. The housing is provided with suitable securing ears 11—11 receiving rivets or other suitable securing elements by which the housing is fixed to the end wall of the car. The housing contains a chain winding drum 12, a worm wheel 13, and a worm 14. The worm 14 is driven by the usual manually actuated hand wheel of the brake mechanism, said hand wheel being indicated by the dotted line 15. The worm 14 meshes with the worm wheel 13, and the latter drives the drum 12 through my improved clutch mechanism. As clearly shown in Figure 1, the worm wheel and drum are rotatable about a common axis and are suitably journaled in the housing 10. The usual chain 16 which is employed to transmit the power to the brake shoes has the end thereof fixed to the chain winding drum 12 in the usual manner so that the chain will be wound on the drum when the same is rotated in the proper direction. The worm wheel 13 forms the driving member, and the drum 12 the driven member of my improved clutch mechanism. The member 12 is hollow as shown and has the left-hand end portion, as seen in Figure 1, enlarged as indicated at 17. Said enlarged portion is provided with interior clutch projections 18—18 arranged in annular series. The member 13 is provided with an axial opening 19 which is of square cross-section and tapered in a direction away from the member 12. A sliding clutch element 20 is employed to operatively connect the worm wheel 13 and the chain winding drum 12. The clutch element 20 has a clutch head 21 and a shank or stem 22 formed integral therewith. The clutch head is provided with a plurality of clutch projections 23 which cooperate with the interior clutch projections 18 of the member 12. As shown in Figure 1, the clutch projections 23 of the clutch head have the driving faces 24 thereof inclined with respect to the axis of rotation of the clutch element. The cooperating faces of the clutch projections 18 of the member 12 are similarly inclined. The clutch stem 22 is tapered in the same direction as the opening 19 of the member 13 and is also of square cross-section so as to fit within said opening, thereby causing the clutch element to rotate in unison with the member 13.

The clutch element 20 is held in clutching relation with the projections 18 of the drum by means of a spring 25 disposed within the hollow portion of the drum and engaging at one end an abutment wall 26 on the housing, and at the other end the head of the clutch member 20. As will be evident, the action of the spring 25 holds the clutch stem 22 seated within the opening 19 of the member 13. In order to prevent sticking of the stem within said opening, the parts are so proportioned that the clutch head 21 will have shouldered engagement with the right-hand end portion of the member 13 to limit the movement of the clutch element toward the left, as viewed in Figure 1. In order to disengage the clutch element from the clutch projections 18 of the member 12, an operating lever 27 is provided. This lever has suitable trunnions 28—28 at opposite sides thereof which are journaled within bearing seats provided in the housing 10. At the inner end, the lever 27 is provided with a cam head 29 which cooperates with a cylindrical projection 30 on the clutch stem 22. The cylindrical projection 30 corresponds in diameter to the width of the smaller end of the tapered opening 19, as clearly shown in Figure 2, whereby the walls of the opening are tangent to the curved surface of said stem, and the stem is held centered when the clutch is slid inwardly. In the normal position of the lever 27, which is that shown in Figure 1, the clutch element is in engagement with the projections 18 of the member 12. As will be evident, when the member 13 is rotated in a clockwise direction, as viewed from the left in Figure 1, through the worm 14, the clutch element 20 will be rotated therewith, thus driving the member 12 and winding the chain thereon to tighten the brakes. In order to quickly release the brakes, the clutch element 20 is disengaged from the drum, thereby permitting the drum to rotate freely with respect to the driving member 13. To release the clutch, the operating lever is swung upwardly to the left from the position shown in Figure 1, thereby camming the clutch element 20 to the right and disengaging the clutch projections 23 from the projections 18. When the operating lever 27 is dropped to the pendant position shown in Figure 1, the expansive action of the spring 25 will return the clutch element to clutching position.

As will be understood by those familiar with the railway brake art, when the brakes are tightened, the chain is under considerable tension, thereby causing considerable pressure between the clutching faces of the clutch element and driving and driven members. By providing the tapered stem on the clutch element engaging within a tapered opening of the driving member and the inclined engaging faces on the clutch projections of the clutch head and the driven member, the release of the clutch element is greatly facilitated due to the reduction of friction between the parts when the clutch element is reciprocated and especially when moved in a direction to disengage the clutch head. This reduction in friction is due to the contacting faces of the clutch stem and walls of the opening of the driving member being moved away from each other and out of direct contact when the clutch element is moved in disengaging direction. Inasmuch as this action is instantaneous, a minimum amount of effort is required in operating the clutch.

Referring next to the embodiment of the invention illustrated in Figures 4 and 5, the improved clutch mechanism is employed in connection with a hand brake of the same type as illustrated in Figures 1, 2, and 3. The driven member or drum of the brake mechanism is also indicated by 12 in Figure 4. The driving member, which is indicated by 13, corresponds to the worm wheel 13 hereinbefore described. The drum 12 is hollow, as clearly shown in Figure 4, and contains a spring 25 corresponding to the spring 25 hereinbefore described, which yieldingly holds the clutch engaged with the member 12. The clutch element in Figures 4 and 5 comprises a clutch head 121 and an integral stem or shank 122. The clutch head 121 is provided with clutch projections 123 corresponding to the clutch projections 23 of the clutch head 21 hereinbefore described, said projections 123 cooperating with clutch projections on the interior of the member 12. The stem 122 is provided with a plurality of longitudinally extending clutch ribs 130—130 which are of the tapering form clearly shown in Figure 4. The opening of the member 13, in which the stem 122 of the clutch element slides, is provided with a plurality of longitudinally extending grooves in the wall thereof, which grooves correspond in cross-sectional shape to the ribs 130 of the clutch element. As clearly shown in Figure 4, the driving faces of the ribs 130 are inclined reversely to the driving faces of the clutch projections 123—123 of the clutch head. The clutch stem 122 projects outwardly beyond the member 13 and is engaged by the cam head 129 of the operating lever 127, which lever corresponds to the lever 27 hereinbefore described. As will be evident, to disengage the clutch, the lever 127 is moved to the left and upwardly, thereby forcing the clutch element to the right, as viewed in Figure 4, in disengaging the clutch projections 123—123 from the cooperating clutch projections of the member 12. When the lever 127 is returned to the position shown in Figure 4, the expansive action of the spring 25 reengages the clutch with the projections of the drum 12. By providing the tapered ribs 130—130 on the clutch stem, which have engaging faces reversely inclined to the engaging faces of the clutch projections 123—123 of the head 121, the inherent friction is greatly reduced when actuating the clutch element, because in disengaging the clutch element the movement of the inclined faces of both the clutch projections and the ribs is in a direction to cause separation of these faces from the cooperating inclined faces of the driven and driving members. A minimum amount of effort is thus required in releasing the clutch mechanism.

I have herein shown and described what I now consider the preferred manner of carrying out my invention, but the same is merely illustrative and I contemplate all changes and modifications that come within the scope of the claims appended hereto.

I claim:

1. In a clutch mechanism, the combination with a rotary driving member; of a rotatable driven member, said members being rotatable about a common axis; and a reciprocating clutch element having a clutch head and a shank portion, said head cooperating with one of said members, and the other member having an axial opening, the shank of said clutch element being slidable axially of and within said opening, said shank having a tapered section engageable within a tapered section of the opening of said member.

2. In a clutch mechanism, the combination with a rotary driving member; of a rotatable driven member, said members being rotatable about a common axis; and a reciprocating clutch element having a clutch head and a shank portion, said head cooperating with one of said members, and the other member having an axial opening, the shank of said clutch element being slidable axially of and within said opening, said shank having a tapered section engageable within a tapered section of the opening of said member, said clutch head also having shouldered engagement with said member in which it is slidable to limit the movement of said clutch element toward said member and prevent tight seating of the shank thereof in said opening.

3. In a clutch mechanism, the combination with a rotary driving member; of a rotatable driven member, said members being rotatable about a common axis, and one of said members having an inwardly tapering opening of non-circular cross-section; a reciprocating clutch element having a clutch head and a tapered shank portion, said shank portion being slidable in said opening of said member and the clutch head being engageable with clutch means on the other member; and means for reciprocating said clutch element.

4. In a clutch mechanism, the combination with a rotary driving member; of a rotatable driven member, said members being rotatable about a common axis, and one of said members having an inwardly tapering opening of non-circular cross-section; a reciprocating clutch element having a clutch head and a tapered shank portion, said shank portion being slidable in said opening of said member and the clutch head being engageable with clutch means on the other member, said clutch element having shouldered engagement with said member in which it is slidable to limit movement of said element inwardly of said member; and means for reciprocating said clutch element.

5. In a clutch mechanism, the combination with a rotary driving member; of a rotatable driven member, said members being rotatable about a common axis, one of said members having a tapered axial opening of angular cross-section; a reciprocating clutch element having a clutch head and a shank, said shank being slidable within the opening of said last named member, corresponding in cross-section to said opening and tapered in the same direction, said head being engageable with the other member to operatively connect said clutch element therewith; and means for actuating said clutch element.

6. In a clutch mechanism, the combination with a rotary driving member; of a rotatable driven member adjacent thereto and coaxial therewith, one of said members having an axial opening of square cross-section, said opening being tapered inwardly away from the other member, said last named member having clutch projections thereon; a clutch element having a clutch head and a tapered shank, said clutch head being engageable with said clutch projections, and the shank being slidable within said tapered opening, said shank being of square cross-section and tapered in the same direction as said opening; and means for moving said clutch element to engage the clutch head thereof with said clutch projections and disengage the same therefrom, said shank being forced inwardly of said opening when the clutch head is engaged with the clutch projections.

7. In a clutch mechanism, the combination with a rotary driving member; of a rotatable driven member, said members being rotatable about a common axis; a reciprocating clutch element for operatively connecting said members, said element being slidable lengthwise in a direction axially of said members, said element having a portion thereof of tapered formation, said portion being tapered in a direction lengthwise of said element; a fixed clutch head on said element; clutch means on one of said members engageable by said clutch head, the other member having a tapered seat within which said portion of tapered formation is reciprocable, said portion of tapered formation having driving engagement with said seat; and means for reciprocating said clutch element.

8. In a clutch mechanism, the combination with a rotary driving member; of a rotatable driven member, said members being rotatable about a common axis; and a reciprocating clutch element having a clutch head and a shank portion, said head cooperating with one of said members, and the other member having an axial opening, the shank of said clutch element being slidable axially of and within said opening, said shank and the walls of the opening having shouldered engagement on faces inclined to the line of axial sliding movement of said element, said clutch head also having shouldered engagement with said member in which it is slidable to limit the movement of said element toward said member and prevent tight seating of the shank thereof in said opening.

9. In a clutch mechanism, the combination with a rotary driving member; of a rotatable driven member, said members being rotatable about a common axis and having axial openings therethrough, each member having clutch projections within the opening thereof; a reciprocable clutch element slidable within the openings of said members, said clutch element having shoulders engaging with the projections of one of said members and additional shoulders engageable with the projections of the other member, said shoulders and additional shoulders having engagement with the clutch projections of said members respectively along reversely inclined faces; and means for actuating said clutch element.

WILLIAM A. GEIGER.